May 5, 1964 W. M. KAHN 3,132,335

ELECTRICAL SIGNAL DIGITIZING APPARATUS

Filed Sept. 30, 1958 3 Sheets-Sheet 1

INVENTOR.
WILLIAM M. KAHN
BY Henry L. Hanson
ATTORNEY

May 5, 1964 W. M. KAHN 3,132,335

ELECTRICAL SIGNAL DIGITIZING APPARATUS

Filed Sept. 30, 1958 3 Sheets-Sheet 2

INVENTOR.
WILLIAM M. KAHN
BY Henry L. Hanson
ATTORNEY

INVENTOR.
WILLIAM M. KAHN
BY Henry L. Hanson
ATTORNEY

United States Patent Office 3,132,335
Patented May 5, 1964

3,132,335

ELECTRICAL SIGNAL DIGITIZING APPARATUS

William M. Kahn, Brighton, Mass., assignor to Minneapolis-Honeywell Regulator Company, Minneapolis, Minn., a corporation of Delaware Filed Sept. 30, 1958, Ser. No. 764,396
11 Claims. (Cl. 340—347)

A general object of the present invention is to provide a new and improved apparatus useful in the field of digital data conversion. More specifically, the present invention is concerned with a new and improved data digitizing circuit which is characterized by its simplicity, its accuracy, and the use of solid state devices in a data digitizing or conversion apparatus.

Digital converters or digitizers are used in many types of data processing in data reduction circuits. The requirement of such circuits is that they be capable of accepting certain types of information on the input and produce therefrom on the output certain digital data. The information on the input may take the form of coded digital information or it may take the form of analog information. In either event, a signal conversion may be required in order to change the form of the information into information usable in a preselected digital code on the output.

In accordance with the teachings of the present invention, there is provided a new and improved digital converter circuit employing magnetic saturable core devices which may be selectively saturated by information and/or control signals for purposes of effecting a conversion of input information into a digital output signal. These magnetic core devices may be arranged so that they are capable of selectively passing or inhibiting the flow of a signal current in an electrical circuit in such a manner that the passage of a signal may be used to represent digital data.

In one form of the invention, there is provided a circuit which is capable of producing a digital count, in binary form, of the number of input devices that may be in a preselected state. In such devices, it is desirable that a constant current signal be used in combination with a plurality of switching devices which are capable of creating preselected amounts of flux saturation in the saturable cores of the circuitry. The flux condition created by the input signal is generally arranged so that it is effective in a first direction in each of the saturable core devices. The counterbalancing of the flux condition by an appropriate signal source can be arranged so that a selected core of a plurality may be uniquely unsaturated in the overall combination. By providing appropriate sensing means, the presence of the unsaturated core may be appropriately related to an input signal and an output digital representation.

It is, therefore, a further more specific object of the present invention to provide a new and improved digital conversion apparatus utilizing a plurality of saturable core devices arranged to receive a predetermined input saturation current which is adapted to be opposed by a reverse saturating current in each of the core devices where the reverse saturating current is variable in its effect on the associated saturable devices so that a single unique core device will be selected wherein the saturating signals will be balanced.

When the present apparatus is used in converting input digital information to output digital information, it is possible to achieve a high degree of accuracy by incorporating a common current source for the control of the saturation of the saturable core devices used in the circuit. The use of a common current source for the control windings which establish selection of the core device in which a balance of fluxes is to be achieved permits the circuit to function even though there may be current variations in the circuit.

It is, therefore, a still further more specific object of the present invention to provide a new and improved digital to digital converter utilizing a single common current source for all of the control windings on a plurality of core devices used in a predetermined digital conversion.

When the present circuitry is utilized in an analog to digital type of conversion circuit, the basic principle of uniquely selecting a single core from a plurality of cores may be utilized so that a saturated condition in each core device is different from the other so that within the range of operability of the circuit a selected level of saturation may be achieved where there is a balancing of the saturating fluxes and a signal may be coupled through to identify digitally the particular level of the unknown input saturating current. In another form of the apparatus, a single magnetic core device may be utilized with appropriate switching means provided for varying the saturating current signals in the core device until a predetermined balance is achieved between the input and output and by further providing means for sensing the presence of a balance condition and appropriately indicating the digital value of the unknown input saturating current.

It is therefore a still further object of the present invention to provide a new and improved analog to digital converter which is characterized by the use of magnetic core means that is adapted to have an unknown saturating current applied thereto and a counterbalancing known saturating current applied thereto for purposes of establishing a predetermined level of saturation in the core means which may be used to identify digitally the magnitude of the input unknown current signal.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
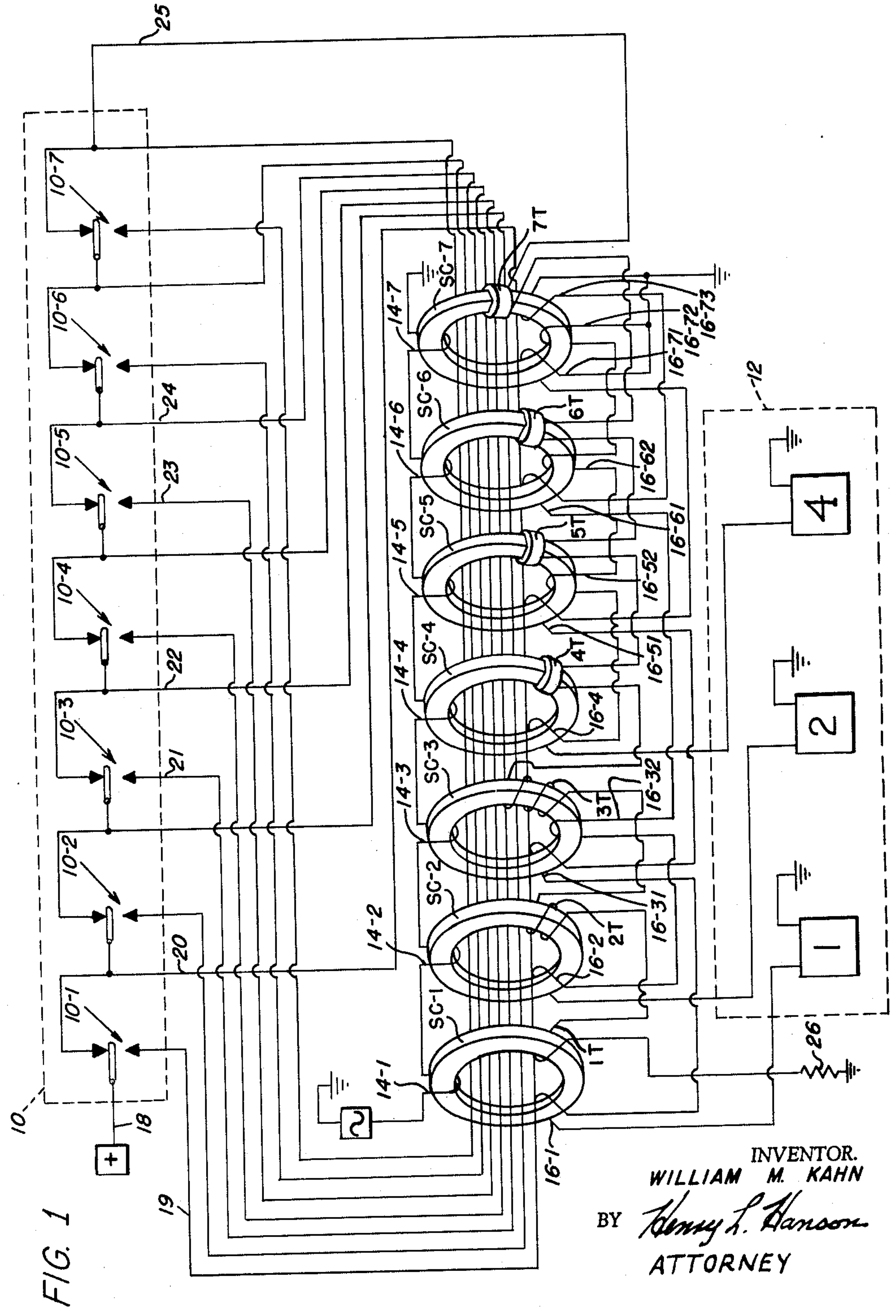
FIGURE 1 is a diagrammatic representation of one form of the invention used in converting a digital input in one digital form to a digital output in a second digital code form.

Referring first to FIGURE 1, the numeral 10 identifies a switching circuit incorporating a plurality of electrical switches each of which are adapted to assume one or the other of two predetermined positions. These switches may be automatically or manually operated by a means well known in the art and may further, within the principle of the present invention, take on electronic forms. In the particular apparatus illustrated in FIGURE 1, it is intended that the overall circuit combination provide a means for counting the number of switching units within the switching circuit 10 that are operated in a predetermined state and indicate the result in a suitable binary counter 12. The digitizing or converting apparatus for achieving this end is a circuit which is used to couple the input switching section 10 to the output counting section 12.

Considering the switching circuit 10 more specifically, this circuit comprises seven switches. The switching circuitry illustrated in the circuit 10 comprises a plurality of two position switches 10-1, 10-2, 10-3, 10-4, 10-5, 10–6, and 10–7. Each of these switches is illustrated with an upper and a lower contact with the blade of the switch shown engaging the upper contact.

The conversion circuitry incorporated in the apparatus of FIGURE 1 takes the form of a plurality of magnetic core devices of the saturable type. The seven core devices illustrated carry the designations SC1, SC2, SC3, SC4, SC5, SC6, and SC7. Passing through each of these saturable core devices SC1–SC7 are a plurality of input windings, each of which may form a unit of M.M.F. in the same sense at each of the core devices. Inasmuch as there are seven switches in the switching circuit 10, there are seven input windings associated with the saturable core devices SC. Each of the windings is adapted to have a current passed therethrough if the associated switch from the switching circuit 10 is switched so that the blade engages the lower contact of the switch. The current from these input windings is adapted to flow in the same direction through each of the respective core devices and tends to saturate the core devices in a first direction.

Each of the saturable core devices SC also includes a saturating winding tending to saturate the core device in the opposite direction. These latter windings are identified by the designation T on the respective saturable core devices SC. In accordance with the teachings of the present invention, the amount of saturation produced by this second winding means T on the respective core devices is varied in each of the devices in accordance with the number of turns on the core devices. Thus, the saturable core device SC1 has a single turn reverse saturating winding 1T. Similarly, the core device SC2 has a reverse saturating winding 2T and has twice as many turns as that of the core SC1. Similarly, three reverse turns of the saturating winding 3T are incorporated on the core SC3.

Also wound on each of the saturable core devices SC is a saturation test winding 14, said winding being adapted to thread each of the respective saturable core devices in equal amounts. This test winding is connected to a suitable source of alternating current which is adapted to vary the flux in any one of the core devices which is not in a saturated state.

Output windings are also coupled to their respective saturable core devices in accordance with the desired digital output indication desired from the conversion circuitry. These output windings are identified by the numeral 16. Since, in the presently described apparatus, a binary indication is desired from the conversion circuitry, the output windings on the respective cores are so arranged that a number of output windings on any particular core are directly related to the binary representation required for uniquely identifying a selected core. Thus, if a signal is coupled through the saturable core device SC1 from the input winding 14–1, it will be picked on the output winding 16–1 and applied to the indicator 1 of the output indicating circuit 12. Similarly, if the saturable core device SC2 is not saturated and a signal is coupled thereto, the output winding 16–2 will couple an appropriate signal to the indicator section 12 on the indicator 2.

If the third saturable core device SC3 is the one of the combination which is not saturated, an output signal will be coupled to both of the output windings 16–31 and 16–32, the latter in turn being coupled to the indicator units 1 and 2 of the indicating section 12. The saturable core device SC4 will have a single output winding 16–4 while the saturable core device SC5 will have two output windings 16–51 and 16–52, the latter being coupled to the indicating units 1 and 4 respectively in the indicating section 12. Saturable core device SC6 has a pair of output windings 16–61 and 16–62 and the output core device SC7 has three output windings 16–71, 16–72, and 16–73.

Considering the overall operation of the circuit of FIGURE 1, it should first be noted that the circuit functions to provide a binary count of the number of input switches that may be operated in the switching circuit 10. Thus, if one of the input switches should be operative, it is desired that the indicating means representing the digit 1 in the output be appropriately operative. On the other hand, if seven of the input switches should be operative at the same time, it is desired that the indicating units for the binary weights 1, 2, and 4, respectively, in the indicating section 12 all be operative.

Assume first that the switches which are operated in the switching section 10 are switches 10–1, 10–3, and 10–5. Assume further that the switches 10–2, 10–4, 10–6, and 10–7 all remain in the position in which they are shown on the drawing. With three of the input switches in the section 10 operated, three of the input windings will be connected in series with the positive potential source. This circuit may be traced as follows: From the positive potential source through lead 18, the switch blade of the switch 10–1, the lower contact of the switch, lead 19, through the cores SC1–SC7 to lead 20, the switch blade and upper contact of the switch 10–2, the switch blade and lower contact of the switch 10–3, lead 21, through the core SC1–SC7 to lead 22, to the switch blade and upper contact of the switch 10–4, the switch blade and lower contact of the switch 10–5, lead 23 through the cores SC1–SC7 to lead 24 to the switch blade and upper contact of switch 10–6, the switch blade and upper contact of switch 10–7 to the lead 25. The output lead 25 from the switching section 10 is coupled to the reverse windings T on the saturable core devices SC. Each of the windings T on the respective saturable core devices are connected in series and thence through a resistor 26 to ground to thereby complete an electrical circuit from the positive input lead 18.

From the aforetraced circuit, it will be apparent that three of the input windings have the current from the positive potential source flowing therethrough. Thus, if the current flow in these windings be considered as a unit of current I, each setting a number of flux-units $\phi$, in all of the saturable core devices due to current in the input windings there will therefore be $3\phi$ flux-units in each core. Assuming that the unit of flux $\phi$, is sufficient to saturate any one of the cores, it will be apparent that, in the absence of some other feedback or reverse signal, all of the cores with the current 3I flowing therethrough will be saturated. However, due to the fact that the reverse saturating windings T are provided on the cores, the current flowing through these reverse saturating windings tends to reverse the flux condition in each of the cores. Since the input saturating current is 3I, and since I is flowing in the reverse saturating windings, there will be a balancing of the currents insofar as the cores are concerned in that one core where the effect of 3I in the reverse current equals the 3I of the input windings. This will occur in the core SC3 since there are three turns in the feedback winding. Since the core device SC3 is not saturated, the alternating signal applied to the input winding 14–3 will be coupled through this core to the output windings 16–31 and 16–32. The winding 16–31 is associated with the indicating device 1 of the indicating section 12 while the winding 16–32 is associated with the indicating device 2 of the indication section 12. Thus, if the indicating devices 1 and 2 take the form of electric lamps, both of the lamps 1 and 2 will be lit indicating in binary terms that three input switches of the switching section 10 have been operated.

It will be apparent that any other combination of three input switches which may be actuated in the switching circuit 10 will produce a similar current relationship in the saturable core devices with the saturable core device SC3 being the only core which is not saturated in one direction or the other. Thus, any three input actuated switches will produce an indication of three in the output indicating circuit 12.

If any other number of switches should be operated, the corresponding saturable core device related to the number of actuated switches will be the core device which is not saturated. Thus, if there are five switches operated, the core device SC5 will not be saturated due to a balancing of the input flux and the reverse flux in the core device so that an alternating signal can be coupled through this core to the output winding 16–51 and 16–52. In this case, the indicating units which will be operated in the indicating section 12 will be 1 and 4.

It will be readily apparent that the relationship of the number of turns for any particular input switching device may be weighted in a preselected manner. In other words, while a single current is associated with each of the switching circuits 10–1 through 10–7, selected ones of these switching circuits may be arranged so that there are multiple turns associated with the respective switches. Thus, the count on the output indicating section 12 may be varied in accordance with the weighted assignments given to the particular switching units of the input section 10.

It will be noted in the circuit of FIGURE 1 that the current flow of the input windings associated with the switching units 10 is the same current flow that is used in the reverse saturating windings T of the saturable core devices SC. Since the same current flow is used in both sets of windings, the current flows will always be matched even though the absolute current value flowing from the positive potential source should vary. Thus, the accuracy of the circuit is assured even though there may be supply voltage variations in the circuit.

Figure 2:
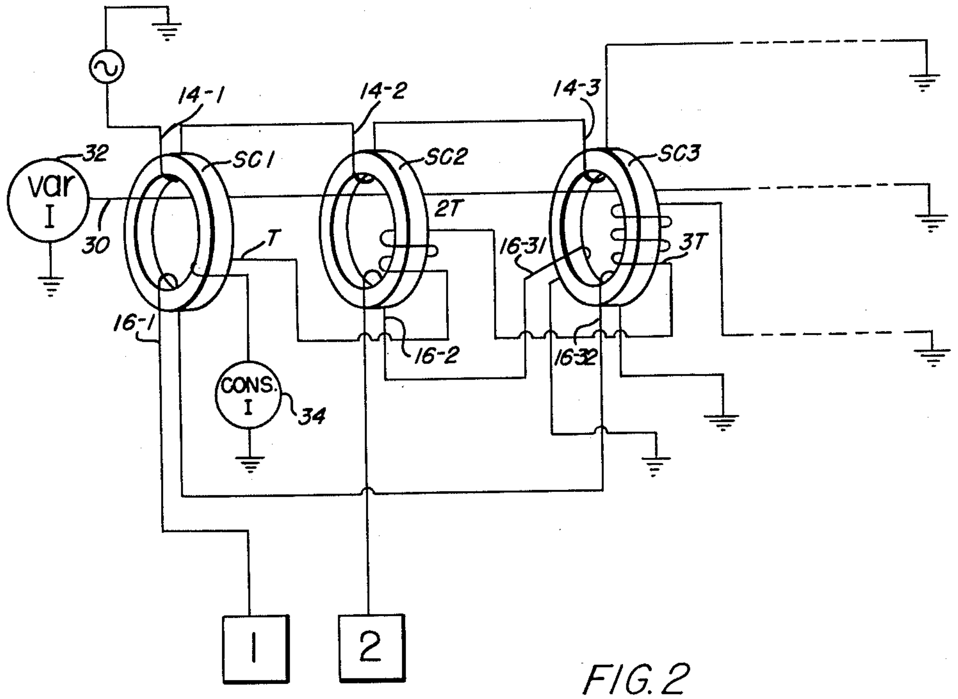
FIGURE 2 is a diagrammatic representation of a circuit useful in an analog to digital converter.

Referring next to FIGURE 2, there is here illustrated how the principles of the present invention may be applied to an analog to digital converter. In this figure, the basic conversion circuitry and indicating circuitry is the same as that of FIGURE 1 and the corresponding components carry corresponding reference characters. Substituted in FIGURE 2 for the input windings of FIGURE 1 is a single input winding from a lead 30 which passes through all of the saturable core devices SC in the combination. This input lead 30 is connected to a variable current source 32 which may be considered as an analog current source whose magnitude it is desired to indicate digitally by the output indicating means connected to the respective saturable core devices SC.

In the present figure, the greatest degree of saturation in the saturable core devices SC will, of course, be dependent upon the magnitude of the current flowing through the lead 30 in the respective input windings of the saturable core devices from the variable analog current source 32. If the variable current source 32 has a level of current flow equivalent to 2I, where I is the current from the constant current source 34, the saturable core device which will not be saturated will be SC2. Thus, an alternating current signal can be coupled through the core from the input winding 14–2 to the output winding 16–2 and there will be an appropriate indication on the indicating device to thereby give a digital indication of the value or magnitude of the analog current of the source 32. As the current increases or decreases, the degree of saturation from the input windings will of course vary and consequently the degree of saturation with respect to the core devices SC will correspondingly vary.

As soon as there has been a core device selected where there is a balance of the input and reverse saturating fluxes, a signal will be coupled through the related core device and thence to the indicating circuitry on the output.

Figure 3:
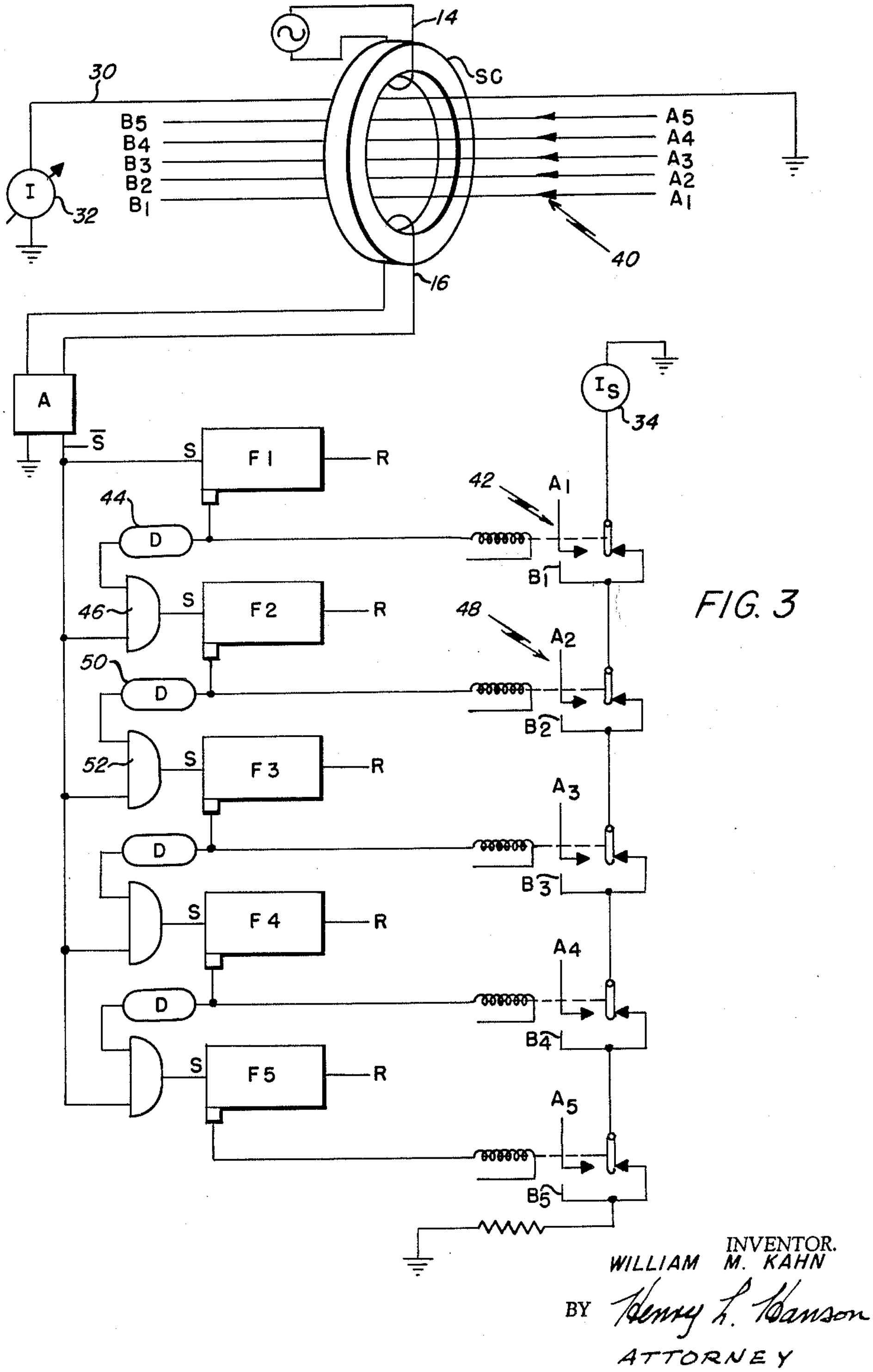
FIGURE 3 is a modified version of an analog to digital converter using some of the principles of the present invention.

The circuitry of FIGURE 3 represents another form of analog to digital converter utilizing a single saturable core device SC in combination with a plurality of reverse flux producing windings 40.

Connected to the output winding 16 is an appropriate amplifier A which has an output signal $\overline{S}$ whenever there is no signal coupled from the input winding 14 to the output winding 16. This output signal $\overline{S}$ from the amplifier circuitry A is adapted to be utilized with a plurality of reverse signal flip-flops F1, F2, F3, F4, and F5. The flip-flop circuits F1 through F5 are adapted to be set in sequence and the flip-flop F1 will be directly set by way of the signal $\overline{S}$ applied to the set side thereof. When set, the flip-flop F1 is adapted to apply an energizing voltage to a relay 42 having an appropriate energizing coil, a switch blade, and a pair of contacts one of which is engaged when the relay is de-energized and the other of which is engaged when the relay is energized. The switch blade and contacts of the relay 42 are used for controlling the flow of current through the reverse saturation winding $A_1$—$B_1$ in accordance with whether or not the relay is in the energized state. The current through the reverse winding $A_1$—$B_1$ will be produced by way of a standard current source $I_S$ in the manner corresponding to that of the current source 34 in FIGURE 2.

A delay line 44 is shown coupling the output of the flip-flop F1 to an input set gate 46 on the flip-flop F2. This flip-flop F2 will be set if the signal $\overline{S}$ is present on one of the gate legs of the gate 46 and a signal is received through the delay line 44 from the flip-flop F1 indicating this flip-flop has been set.

When set, the flip-flop F2 is adapted to energize a control relay 48, the latter having the same general configurations as the control relay 42. The output of the flip-flop F2 is also coupled by way of a delay line 50 to an input set gate 52 on the input of the flip-flop F3. Also applied to the input of this set gate 52 is a signal $\overline{S}$.

It will be apparent that a similar circuit configuration exists with respect to the output of the flip-flops F3, F4, and F5, or as many flip-flops as may be required in any particular conversion problem.

In the particular circuitry illustrated in FIGURE 3, when there is a predetermined current level existing from the variable current source 32 on the lead 30, the core device SC will be saturated in a first direction with the degree of saturation being dependent upon the magnitude of the current flowing in the leads 30. At the start of any particular conversion problem, the flip-flops F1 through F5 will all be reset so that the associated output relays will be in the de-energized state where they are shown in the drawing. Thus, there will be no current flowing through any of the reverse saturation windings 40 associated with the core device SC. At the start of the conversion, assuming the current level in the lead 30 is equivalent to twice the basic current increment I, or 2I, the core device SC will be saturated. Consequently, there will be no alternating signal coupled through the core SC from the winding 14 to the output winding 16 and the amplifier device A will be producing the signal $\overline{S}$. The signal $\overline{S}$ will be effective to set the flip-flop F1. When set, this flip-flop will pick the relay 42 and thereby establish a current flow circuit from a standard current source $I_S$ through the switch blade to the relay 42, the energized contact to the relay 42, lead $A_1$, lead $B_1$, and thence on to the ground terminal through the de-energized contacts of the other relays of the series. The addition of the current $I_S$ in the reverse winding $A_1$—$B_1$ will not be sufficient to counter-balance a saturating flux produced by the current flowing through the lead 30. Consequently, the amplifier A will still have an output $\overline{S}$. After a predetermined time delay, the delay being established in part by the delay of the relay 42, a signal will be coupled through to the gate 46 from the flip-flop F1 and by this the flip-flop F2 will be set. When set, this flip-flop F2 will pick the relay 48 so that now the reverse saturating winding $A_2$—$B_2$ will be connected in series with the standard current source 34. If this second increment of current is sufficient, with that produced by the relay 42, to balance the current from the lead 30, the core SC will now have the saturating fluxes therein balanced and it will be possible to couple a signal from the input winding 40 to the output winding 16. This will cause the signal $\overline{S}$ to be removed from the remaining circuits and the fact that the relay devices 42—48 have been picked will serve as an indication that two units of current are flowing from the analog device 32.

If five units of current should be flowing from the source 32 through the lead 30 and the saturable core device SC, it will be necessary for the flip-flops F1–F5 to step in sequence until such time as the fifth flip-flop F5 has been set and the output relay thereof picked. When this occurs, there will be five units of reverse current flowing through the reverse saturating windings 40 to balance the flux conditions in the core SC produced by the current flowing through the lead 30. The fact that five relays have now been picked will be an indication that five units of current are flowing from the source 32. It will be apparent that this technique may be extended to additional units so that the analog current value will be appropriately balanced by the switching relays activated by an output flip-flop device.

It will be apparent from the foregoing discussion that there has been provided a new and improved type of digitizing circuit which is adapted to convert digital information in one form into a second form of digital information and/or analog information into digital information. This circuit arrangement is inherently simple and reliable in its operation in that it uses solid state devices in the heart of the conversion circuitry.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. An analog to digital converter comprising an analog signal source, a plurality of saturable core devices, a first winding means threading said core devices and connected to said analog signal source to tend to saturate said core devices in a first direction, a constant direct current signal source, a second winding means threading said core devices, said second winding means threading each core device by a different number of turns, means connecting said second winding means to said constant current source to tend to saturate said core devices in a second direction opposite said first direction to balance the saturation from said first winding means in one and only one of said core devices, core flux switching means connected to said core devices to switch any core device having the saturation effects in any such core balanced, and flux switching sensing means connected to said core devices to sense any core in which the flux is being switched by said flux switching means.

2. An analog to digital converter comprising an analog signal source, a plurality of saturable core devices, a first winding means threading said core devices and connected to said analog signal source to tend to saturate each of said core devices in a first direction and by an equal amount, a constant direct current signal source, a second winding means threading said core devices, said second winding means threading each core device by a number of turns which differ on each core by predetermined digital increments, means connecting said second winding means to said constant current source to tend to saturate said core devices in a second direction opposite said first direction to balance the saturation from said first winding means in one and only one of said core devices, core flux switching means connected to said core devices to switch any core device having the saturation effects in any such core balanced, and flux switching sensing means connected to said core devices to sense any core in which the flux is being switched by said flux switching means.

3. An analog to digital converter comprising a single analog signal source, a plurality of saturable core devices, a first winding means threading said core devices and connected to said analog signal source to tend to saturate each of said core devices in a first direction and by an equal amount, a constant direct current signal source, a second winding means threading said core devices, said second winding means threading each core device by a different number of turns, means connecting said second winding means to said constant current source to tend to saturate said core devices in a second direction opposite said first direction to balance the saturation from said first winding means in one and only one of said core devices, core flux switching means connected to said core devices to switch any core device having the saturation effects in any such core balanced, and flux switching sensing means connected to said core devices to sense any core in which the flux is being switched by said flux switching means, said sensing means comprising means operative in accordance with a binary progression.

4. An analog to digital converter comprising a single saturable magnetic core device, an unknown source of analog signal current connected by a control winding to said core device to produce a flux variation in said core device in a first direction, a standard constant signal direct current source, digitizing means including winding means connecting said standard signal source to said core device to produce flux variations in said core device in a second direction opposite said first direction to tend to balance the saturation from said unknown source, and flux sensing means coupled to said core device and connected to said digitizing means to produce step variations in the operation of said digitizing means and thereby corresponding flux variations in said core device until the saturation effects in said core device are balanced.

5. A digital signal converter comprising a single magnetic core device, a first signal current source, means directly coupling said first current source to said core device to produce varying degrees of flux saturation in a first direction in said core device, a second signal source coupled to said core devices to switch the flux condition of said core device when said core device is not saturated, an output sensing means coupled to said core device to sense flux variations thereon, a constant direct current counterbalancing signal source, and digitizing means connected to said output sensing means and coupled to said core devices to balance the flux created by said first signal source, said digitizing means comprising a plurality of switching devices connecting in sequential incremental steps said counterbalancing signal source to said core device until the flux in said core device due to said first and second signal sources is balanced at which point said sensing means deactivates said digitizing means.

6. A digital converter comprising a plurality of saturable core devices, first current energizing means connected by winding means to said core devices tending to saturate said core devices in a first direction, said first current energizing means comprising a single variable current source, second current energizing means connected by winding means to said core devices tending to saturate said core devices in the opposite direction, said last-named winding means being wound on said core devices to produce a different amount of flux in each of said core devices due to current flowing from said second current energizing means, so that there will be a balancing of the flux due to current from said first energizing means and said second energizing means in a single one of said core devices dependent upon the current variations from said first energizing means, an alternating signal source coupled to each of said devices, an output winding means on each of said devices, each of said output windings having a signal thereon from said alternating signal source when there is no saturation in the related core device, and digital indicating means connected to said output windings.

7. A digital converter comprising a plurality of saturable core devices, first current energizing means connected by winding means to said core devices tending to saturate to the same degree each of said cores in a first direction and by an amount proportional to the current flow from said energizing means, said first current energizing means comprising a single variable current source, second constant direct current energizing means connected by further winding means to said core devices tending to saturate said core devices in the opposite direction, said second means being wound on said core devices to produce a different amount of flux in each of said core devices due to current flowing from said second energizing means so that there will be a balancing of flux due to current from said first energizing means and said second energizing means in one and only one of said core devices in accordance with the magnitude of current from said current energizing means, an alternating signal source coupled to each of said devices, an output winding means on each of said devices, said output winding having a signal thereon from said alternating signal source when there is no saturation in the related core device, and digital indicating means connected to said output windings.

8. A converter as defined in claim 7 wherein said first current energizing means comprises an analog signal source whose output current is steplessly variable.

9. A converter as defined in claim 7 wherein said first current energizing means comprises a plurality of separate windings threading said core devices and a plurality of switches positioned to selectively connect said plurality of windings in series to said single current source.

10. A digital converter comprising saturable core means, a first source of saturating current adapted to be selectively varied in output coupled to said core means to variably saturate said core means in accordance with an input variable, said first source comprising a single current source, a second constant source of saturating direct current selectively coupled in steps of predetermined current increments to said core means to selectively balance in said core means the saturating current from said first source of current, and means coupled to said core means to indicate a nonsaturated state in said core means.

11. In combination, a plurality of two-state electrical switching devices, a plurality of saturable core devices, a plurality of windings common to all of said core devices and each connected to have the current flow therethrough controlled by one each of said two-state electrical devices, each of said windings being positioned to saturate each of said core devices in a first direction in proportion to the current flow therethrough, further winding means on each of said core devices positioned to saturate said core devices in a direction opposite said first direction, said further winding means being wound on said cores in uniformly varable steps so that when a current flows therethrough there will be a different degree of saturation in each of said core devices, a single source of constant saturating direct current, means including said switching devices, when in one of said two states, connecting each related winding in a series circuit with said source of saturating current, means connecting said further winding means in a series circuit with any winding of said plurality connected to said source and in series with said source of saturating current so that there will be a balancing of the saturation in any core device having the same number of said plurality of windings energized as there are windings from said further winding means energized by said single source of saturating current, an energizing signal source connected to effect flux variations in each of said core devices if not saturated by said winding means, and output indicating means connected to said core devices to sense any core device which is not saturated.

References Cited in the file of this patent

UNITED STATES PATENTS

| | | |
|---|---|---|
| 2,691,153 | Rajchman | Oct. 5, 1954 |
| 2,696,347 | Lo | Dec. 7, 1954 |
| 2,734,184 | Rajchman | Feb. 7, 1956 |
| 2,846,671 | Yetter | Aug. 5, 1958 |
| 2,862,197 | Ringelman | Nov. 25, 1958 |
| 2,864,555 | Spencer | Dec. 16, 1958 |
| 2,875,432 | Markow | Feb. 24, 1959 |
| 2,937,285 | Olsen | May 17, 1960 |
| 2,962,704 | Buser | Nov. 29, 1960 |
| 3,004,246 | Harper | Oct. 10, 1961 |
| 3,042,905 | Kosonocky | July 3, 1962 |

OTHER REFERENCES

Publication: RCA Technical Notes, RCA TN No. 110, Magnetic Commutator Switch.